Feb. 3, 1925.
J. E. LESTER
SKIMMER
Filed Aug. 24, 1922
1,524,739
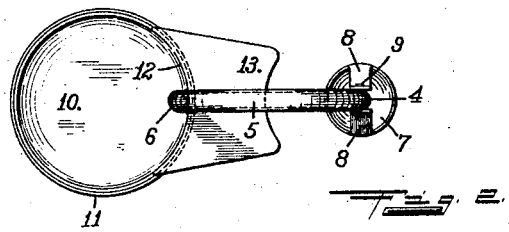
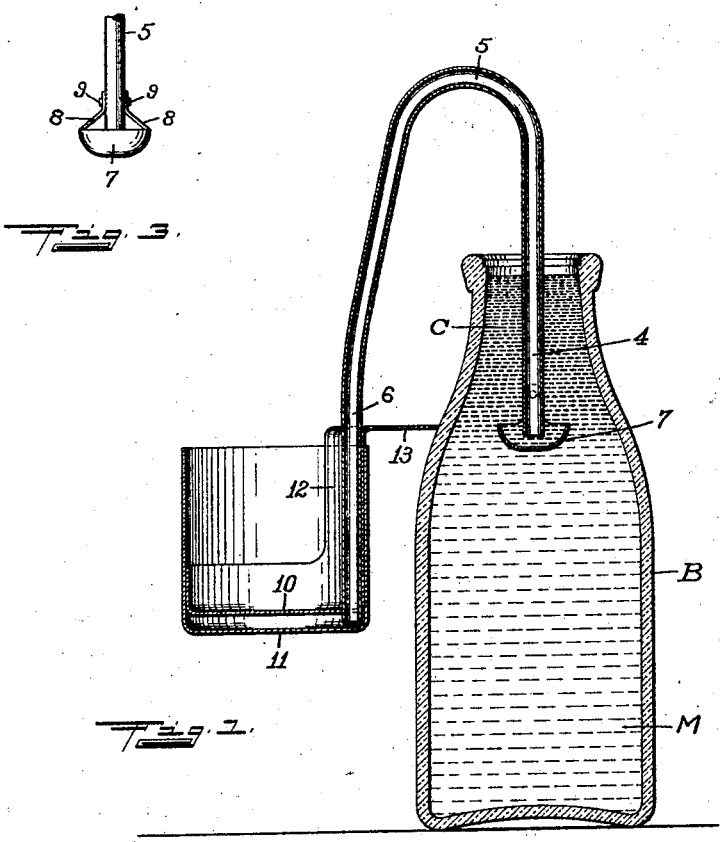
John E. Lester, Inventor.
Witness:
By David O. Barnell,
Attorney.

Patented Feb. 3, 1925.

1,524,739

UNITED STATES PATENT OFFICE.

JOHN E. LESTER, OF LONG BEACH, CALIFORNIA, ASSIGNOR OF ONE-HALF TO W. L. ROHRER, OF LOS ANGELES, CALIFORNIA.

SKIMMER.

Application filed August 24, 1922. Serial No. 584,125.

*To all whom it may concern:*

Be it known that I, JOHN E. LESTER, a citizen of the United States, and a resident of Long Beach, in the county of Los Angeles and State of California, have invented certain new and useful Improvements in Skimmers, of which the following is a specification.

My invention relates to devices for removing cream from bottled milk, and particularly to devices of this kind employing a siphon-tube for drawing off the cream. It is the object of my invention to provide a simple and easily cleanable device of this kind, provided with means for preventing entrance to the siphon of any liquid at a level below that desired to be removed, means for receiving the siphoned liquid and starting the siphonic action, means for indicating the liquid level at which the siphonic action will cease, and means for automatically levelling the skimming-bowl.

In the accompanying drawings, Fig. 1 is a vertical sectional view of a device embodying my invention, in connection with a milk and cream receptacle, Fig. 2 is a plan view of the skimmer, and Fig. 3 is a detail side view of the skimming-bowl or deflecting means at the receiving end of the siphon-tube.

In carrying out my invention I provide a siphon-tube having a straight ascending portion 4, a curved or inverted-U upper portion 5, and a descending portion 6 which is longer than the portion 4 and parallel therewith at its lower end. Said siphon-tube is preferably made of metal suitably finished to resist corrosion thereof. At the lower end of the tube-portion 4 there is arranged a bowl-shaped member 7 having at opposite sides thereof flat arms 8 which extend upwardly and inwardly to the sides of the tube and are pivotally connected with pins 9 which project laterally from the tube and pass through holes in the arms. The bowl 7 is held so that the end of the siphon-tube will extend below the marginal edge of the bowl, but so that said edge may swing past the end of the tube to a position at one side thereof, thus enabling a tube-brush or the like to be inserted into or passed through the tube for effectively cleaning the same. The bowl is freely swingable about the axis of the pins 9, and thus remains normally with the upper or marginal edge horizontal, even though the tube be tilted considerably from a vertical position.

To the siphon-tube near the lower end of the descending portion 6 there is fixedly secured a piston 10, preferably comprising a shallow cup-like body drawn from sheet-metal and fitting slidably within a deeper cup 11, the latter also being preferably drawn from sheet-metal so as to be seamless. The piston or cup 10 has an integral upwardly extended side portion 12 which passes alongside the tube-portion 6 to the level of the marginal part of the bowl 7, and is then turned out horizontally toward the ascending portion 4 of the siphon-tube, to form a gage 13. The end of the gage-portion is rounded concavely, as shown in Fig. 2.

The operation of the skimmer will be readily apparent from Fig. 1, in which there is indicated an ordinary bottle B such as is commonly used by dairies for the delivery of milk. After standing for a few hours in such a receptacle, the liquid contents separate into a lower stratum M of milk and an upper stratum C of cream, indicated respectively by the light and heavy horizontal broken section-lining in said Fig. 1. Usually there is a distinct line of demarcation, known as the cream-line, at the juncture of the two liquid strata. For removing the cream from the bottle, the ascending portion of the siphon-tube is inserted in the neck of the bottle to a depth such that the bowl 7 is near the cream-line. Then the cup 11 is pulled off the piston 10, which causes a reduction of air-pressure within the siphon-tube such that the atmospheric pressure will drive the cream through the tube and start the siphonic action. The cup 11 is held beneath the discharging end of the siphon to receive the cream, and after the flow has started the siphon is lowered until the margin of the bowl 7 is coincident with the cream-line. Although the bowl 7 is concealed by the comparatively opaque fluid, the gage-member 13 serves to indicate the depth to which the bowl is submerged, and said member may also rest against the side of the bottle B to steady the device and facilitate the holding of the same in position. If desired, the bowl 7 may be lowered to the cream-line before starting the siphon, and in this case a very small quantity of the milk may be drawn off with the cream. Even, however, if the margin of the bowl be slightly below the cream-line, the removal of that quantity of milk above the level of the bowl-margin will lower the cream-line to the same level, and thereafter only the cream can flow into the bowl and thence through the siphon to the receiving-cup 11. At the end of the skimming operation, after the upper surface of the liquid has been lowered to the level of the bowl-margin, the liquid in the bowl is drawn out until the level thereof reaches the lower end of the tube-portion 4, and air then enters the tube and stops the siphonic action.

By the described means, all of the cream may be removed from bottled milk without mixing therewith any appreciable quantity of the milk. The use of the bowl 7 at the receiving end of the siphon effectively prevents the withdrawal of any liquid from points below the level of the bowl-margin, and the pivotal suspension of the bowl on the tube enables the bowl to remain automatically in horizontal position, and therefore with its edge constantly parallel with the cream-line. The gage 13 facilitates accurate removal of the cream, by showing at the outside of the bottle the level of the skimming-bowl margin, so that the siphon may be readily lowered to exactly the proper depth in the bottle. By the use of the cup 11 both for starting the siphonic action and for receiving the liquid drawn from the receptacle, waste of the cream is prevented, should any of the same flow through the siphon-tube before the removal of the cup from the piston was completed. In fact, by suitably proportioning the capacity of the receiving-cup and avoiding any considerable leakage of air between said cup and the piston, the cream may be withdrawn solely by the suction of the cup and without the occurrence of any siphonic action.

Now, having described my invention, what I claim and desire to secure by Letters Patent is:

A skimming device comprising a siphon-tube, and a bowl suspended pivotally on an axis near the receiving end of said tube so as to remain automatically in a level position with its marginal portion above said end of the tube, said end of the tube extending into the bowl and the latter being swingable about said axis to a position at one side of the tube.

JOHN E. LESTER.